(12) United States Patent
Lasalandra et al.

(10) Patent No.: US 7,155,979 B2
(45) Date of Patent: Jan. 2, 2007

(54) SELF-CALIBRATING OVERSAMPLING ELECTROMECHANICAL MODULATOR AND SELF-CALIBRATION METHOD

(75) Inventors: Ernesto Lasalandra, S. Donato Milanese (IT); Fabio Pasolini, S. Martino Siccomario (IT); Valeria Greco, Catanzaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 882 days.

(21) Appl. No.: 10/198,720

(22) Filed: Jul. 16, 2002

(65) Prior Publication Data

US 2003/0025983 A1 Feb. 6, 2003

(30) Foreign Application Priority Data

Jul. 18, 2001 (IT) .......................... TO2001A0705

(51) Int. Cl.
*G01P 15/00* (2006.01)
(52) U.S. Cl. ................. 73/514.18; 73/1.38; 73/514.32; 73/514.19; 73/1.37; 73/514.17; 324/661; 324/662; 324/684; 324/686
(58) Field of Classification Search ................ 359/290; 73/514.18, 1.38, 514.32, 514.19, 514.17, 73/1.37; 324/661, 662, 684, 686
See application file for complete search history.

(56) References Cited

U.S. PATENT DOCUMENTS

| | | | | |
|---|---|---|---|---|
| 5,481,905 A | * | 1/1996 | Pratt .............................. | 73/115 |
| 5,960,375 A | * | 9/1999 | Warrior et al. ............... | 702/104 |
| 6,127,811 A | * | 10/2000 | Shenoy et al. ............... | 320/166 |
| 6,621,279 B1 | * | 9/2003 | Ward ............................ | 324/684 |
| 6,674,217 B1 | * | 1/2004 | Fujimoto ................ | 310/323.06 |
| 6,753,691 B1 | * | 6/2004 | Lasalandra et al. .......... | 324/686 |
| 6,798,321 B1 | * | 9/2004 | Hallbjorner ................... | 335/78 |
| 6,856,144 B1 | * | 2/2005 | Lasalandra et al. .......... | 324/661 |
| 6,862,938 B1 | * | 3/2005 | Park et al. ...................... | 73/780 |
| 2003/0052699 A1 | * | 3/2003 | Lasalandra et al. .......... | 324/662 |
| 2005/0066704 A1 | * | 3/2005 | Tanten et al. ................. | 73/1.88 |
| 2006/0156818 A1 | * | 7/2006 | Kapser et al. ............ | 73/514.32 |

OTHER PUBLICATIONS

Mark Lemkin and Bernhard E. Boser, "A Micromachined Fully Differential Lateral Accelerometer", Dept. of Electrical Engineering and Computer Sciences, University of California, Berkeley.*

(Continued)

*Primary Examiner*—Hezron Williams
*Assistant Examiner*—Samir M. Shah
(74) *Attorney, Agent, or Firm*—Lisa K. Jorgenson; Harold H. Bennett, II; Seed IP Law Group PLLC

(57) ABSTRACT

An oversampling electromechanical modulator, including a micro-electromechanical sensor which has a first sensing capacitance and a second sensing capacitance and supplies an analog quantity correlated to the first sensing capacitance and to the second sensing capacitance; a converter stage, which supplies a first numeric signal and a second numeric signal that are correlated to the analog quantity; and a first feedback control circuit for controlling the micro-electromechanical sensor, which supplies an electrical actuation quantity correlated to the second numeric signal. The electromechanical modulator moreover includes a second feedback control circuit for calibrating the micro-electromechanical sensor, which includes an offset-sensing circuit that can be activated by the first numeric signal, and a programmable calibration circuit, having a programmable calibration capacitance, which is connected to the micro-electromechanical sensor and is controlled by the offset-sensing circuit for balancing of the first sensing capacitance and second sensing capacitance.

13 Claims, 5 Drawing Sheets

OTHER PUBLICATIONS

Bernhard E. Boser, "Electronic Interfaces for MEMS Overview", Berkeley Sensor & Actuator Center, Dept. of Electrical Engineering and Computer Sciences, University of California, Berkeley.*

Mark Lemkin and Bernhard E. Boser, "A Micromachined Fully Differential Lateral Accelerometer", Dept. of Electrical Engineering and Computer Sciences, University of California, Berkeley, 1996.*

Bernhard E. Boser, "Electronic Interfaces for MEMS Overview", Berkeley Sensor & Actuator Center, Dept. of Electrical Engineering and Computer Sciences, University of California, Berkeley.*

Lemkin, M., et al., "A Fully Differential Lateral ΣΔ Accelerometer with Drift Cancellation Circuitry," *Solid-State Sensor and Actuator Workshop*, Hilton Head, South Carolina, Jun. 2-6, 1996, pp. 90-93.

* cited by examiner

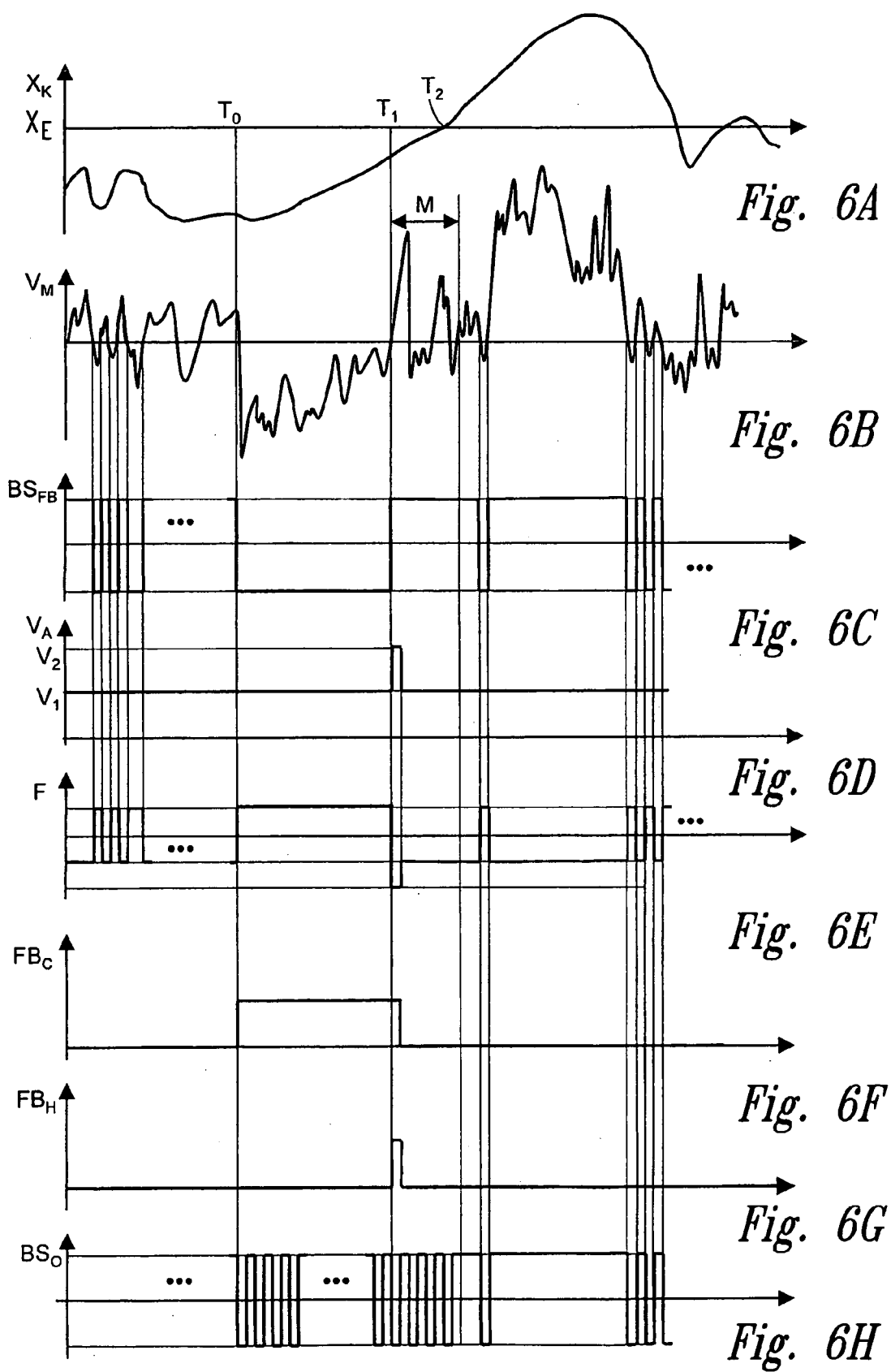

SELF-CALIBRATING OVERSAMPLING ELECTROMECHANICAL MODULATOR AND SELF-CALIBRATION METHOD

BACKGROUND OF THE INVENTION

1. Field of the Invention

The present invention relates to a self-calibrating oversampling electromechanical modulator and to a self-calibration method.

2. Description of the Related Art

As is known, the use of micro-electromechanical-system (MEMS) sensors with differential capacitive unbalance has been proposed for building, for example, linear or rotational accelerometers and pressure sensors.

In particular, MEMS sensors of the above-mentioned type comprise a fixed body (stator) and a mobile mass, which are generally of an appropriately doped semiconductor material, are connected together by elastic-suspension elements (springs) and are constrained in such a way that the mobile mass has, with respect to the stator, predetermined degrees of freedom, which are translational and/or rotational. In addition, the stator and the mobile mass have a plurality of fixed arms and of mobile arms, respectively, in a comb-finger arrangement. In practice, each mobile arm is arranged between a pair of fixed arms, so as to form a pair of capacitors which have a common terminal and a capacitance that depends upon the relative positions of the arms, namely upon the position of the mobile mass with respect to the stator (sensing capacitance). The fixed arms are then connected to external sensing terminals. When a sensor is excited, its mobile mass is displaced and there is an unbalance between the capacitances of the capacitors, which can be detected at the sensing terminals.

In addition, MEMS sensors are equipped with actuation capacitors, which are provided between the stator and the mobile mass and are connected to external actuation terminals. When a voltage is supplied on said actuation terminals, between the plates of the actuation capacitors an electrostatic actuation force is exerted (in all cases of an attractive type), which displaces the mobile mass with respect to the stator. The actuation terminals may even coincide with the sensing terminals.

MEMS sensors are normally associated to electronic read and control components, with which they form oversampling electromechanical modulators.

For greater clarity, reference may be made to FIG. 1, which shows an oversampling electromechanical modulator 1 comprising a MEMS sensor 2, for example a linear-type accelerometer, a charge integrator 3, a one-bit quantizer 4, and a feedback actuator 5, which are connected together so as to form a control loop. In greater detail, the MEMS sensor 2, the charge integrator 3 and the quantizer 4 form the forward path of the control loop, while the feedback actuator 5, which is connected between an output of the quantizer 4 and an actuation input 2a of the MEMS sensor 2, forms the feedback line.

The MEMS sensor 2 is connected to the charge integrator 3, which, in a sensing step, detects the capacitive unbalance of the sensor 2 and supplies, on an output—which is connected to an input of the quantizer 4, an analog signal $V_M$ correlated to said capacitive unbalance. The quantizer 4 generates at its output a bitstream BS, in which each bit represents the sign of the analog signal $V_M$ at a respective sampling instant.

The feedback actuator 5 receives at input the bitstream BS and, in an actuation step following upon the sensing step, supplies to the actuation input 2a of the MEMS sensor 2 a feedback-actuation voltage $V_{FB}$ for counteracting the displacement of the mobile mass of the MEMS sensor 2 and bringing the mobile mass back into the resting position.

In an ideal MEMS sensor, when no external stress are present and no voltages are applied to the actuation terminals, the mobile arms should be exactly in an intermediate position between the respective fixed arms that are arranged facing them, and the capacitances should be balanced. This means that in an ideal electromechanical modulator the mobile mass of the MEMS sensor should oscillate about the nominal resting position, and the bitstream BS should have a zero average (namely, the bitstream BS should be formed by a sequence of bits having alternating logic values, such as +1 −1 +1 −1, etc.).

In actual fact, notwithstanding the extremely high precision of the micromachining techniques used for building MEMS sensors, it is unavoidable that the mobile mass is affected by a position offset; consequently, in resting conditions the mobile arms are not equidistant from the fixed arms. As a result, MEMS sensors have an intrinsic capacitive unbalance which, in an electromechanical modulator, causes an offset of the bitstream BS (in practice, the average of the bitstream BS is not zero).

At present, in order to correct the offset of electromechanical modulators, an in-factory calibration process is carried out, which involves various steps and which will be briefly described with reference to FIG. 2. In addition to illustrating the electromechanical modulator 1, FIG. 2 also shows a measurement-interface circuit 7 and a calibration circuit 8. In particular, the calibration circuit 8 is programmable and supplies a calibration voltage $V_{CAL}$ to a calibration terminal 2b of the MEMS sensor 2 in order to exert an electrostatic force on the mobile mass of the MEMS sensor 2 itself.

First of all, the electromechanical modulator 1 is set in a quiescent state, in which the MEMS sensor 2 does not undergo any stress, and the feedback loop is opened by disconnecting the feedback actuator 5 from the actuation terminal 2a of the MEMS sensor 2.

Next, the measurement-interface circuit 7 is connected to the input of the quantizer 4 and detects the value of the analog signal $V_M$, which, in the conditions described, is due exclusively to the position offset of the mobile mass of the MEMS sensor 2. In particular, the measurement-interface circuit 7 generates an offset signal $V_{OFF}$ correlated to the analog signal $V_M$.

Next, the calibration circuit 8 is programmed by causing the calibration voltage $V_{CAL}$ to vary until the offset signal $V_{OFF}$ is minimized and the mobile mass of the MEMS sensor 2 is brought back into the proximity of the nominal resting position.

Subsequently, if the sensing capacitances present between the mobile mass and the stator of the MEMS sensor 2 are unbalanced, the calibration is completed by connecting one or more calibration capacitors 9 in parallel to the smaller sensing capacitance.

The devices according to the prior art have some drawbacks. In the first place, calibration can be performed only in the factory, and consequently it cannot be ensured that the precision will remain unaltered over time. In fact, the mechanical properties of a MEMS sensor, especially as regards the elastic-suspension elements, are affected by environmental conditions (for instance, by the temperature) and in any case vary on account of the aging of the MEMS sensor itself. In practice, the initial calibration is lost and an offset arises again.

In addition, MEMS sensors are extremely sensitive and are able to detect even minimal vibrations. Consequently, it is very difficult to create a condition of effective absence of stress in which a precise calibration can be performed.

BRIEF SUMMARY OF THE INVENTION

The purpose of the present invention is to provide a self-calibrating electromechanical modulator and a corresponding self-calibration method that will enable the above-mentioned drawbacks to be overcome.

According to the present invention, an oversampling self-calibrating electromechanical modulator and a corresponding self-calibration method are provided.

According to an embodiment of the invention, an oversampling electromechanical modulator is provided, including a micro-electromechanical sensor which has a first sensing capacitance and a second sensing capacitance and supplies an analog quantity correlated to the first sensing capacitance and to the second sensing capacitance; a converter stage, which supplies a first numeric signal and a second numeric signal that are correlated to the analog quantity; and a first feedback control circuit for controlling the micro-electromechanical sensor, which supplies an electrical actuation quantity correlated to the second numeric signal. The electromechanical modulator moreover includes a second feedback control circuit for calibrating the micro-electromechanical sensor, which includes an offset-sensing circuit that can be activated by the first numeric signal, and a programmable calibration circuit, having a programmable calibration capacitance, which is connected to the micro-electromechanical sensor and is controlled by the offset-sensing circuit for balancing of the first sensing capacitance and second sensing capacitance.

According to another embodiment of the invention, a method for calibrating an oversampling electromechanical modulator is provided, in which the modulator includes a micro-electromechanical sensor having a stator body and a mobile mass, between which there are a first sensing capacitance and a second sensing capacitance.

The method includes the steps of supplying a first analog quantity correlated to the first sensing capacitance and to the second sensing capacitance and generating a first numeric signal correlated to said analog quantity. The method further includes connecting, to said micro-electromechanical sensor, a programmable-calibration circuit having a programmable calibration capacitance and modifying the programmable calibration capacitance in the presence of a continuous component of the numeric signal.

BRIEF DESCRIPTION OF THE SEVERAL VIEWS OF THE DRAWING(S)

For a better understanding of the present invention, an embodiment thereof is now described, purely by way of non-limiting example, with reference to the attached drawings, in which.

Figure 1:
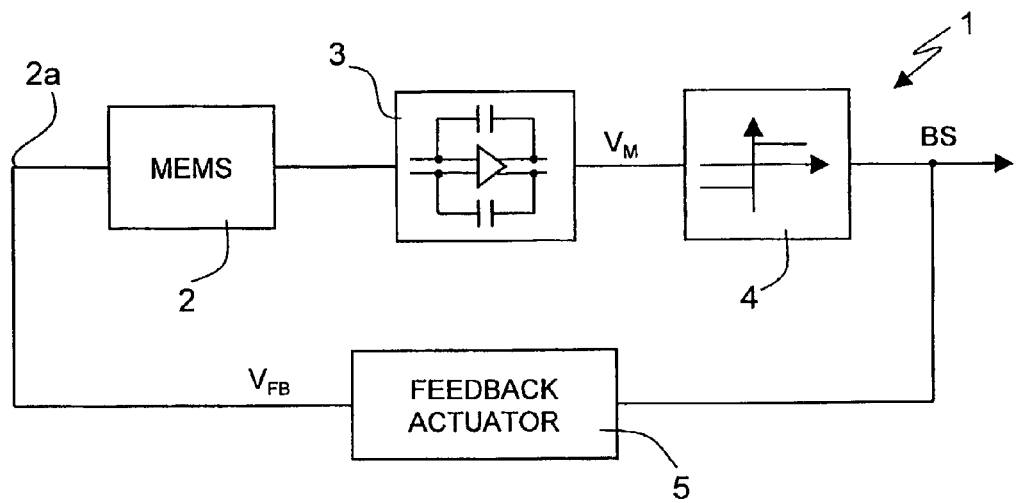
FIG. 1 is a simplified block diagram of an oversampling electromechanical modulator of a known type.
Figure 2:
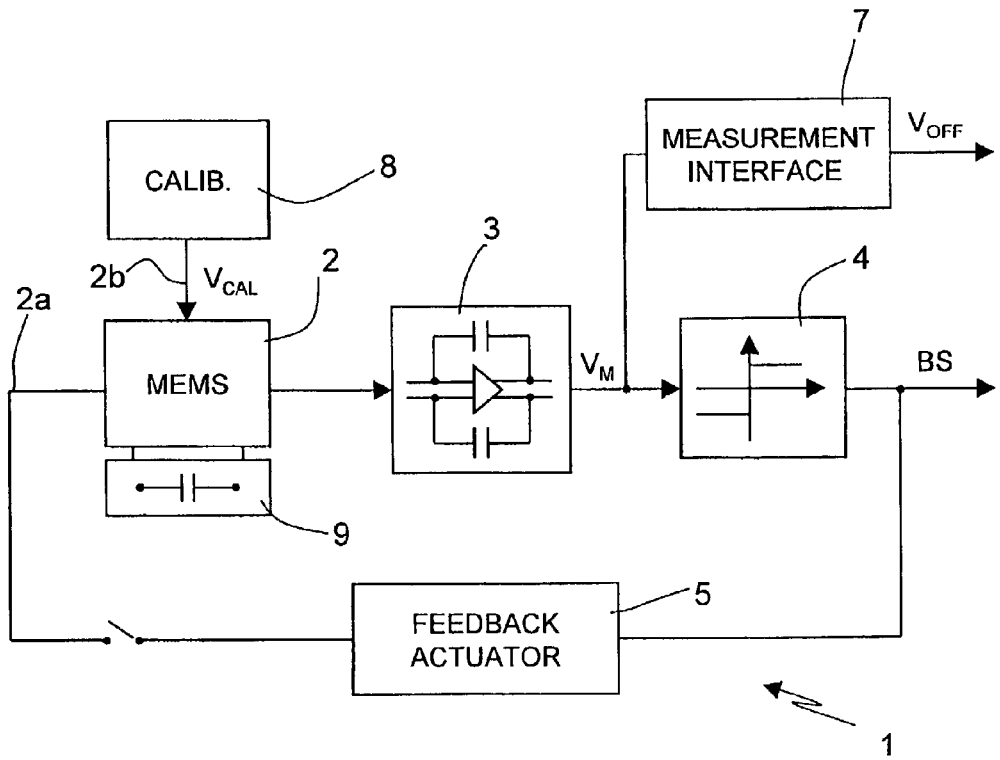
FIG. 2 is a block diagram of the modulator of FIG. 1 in a calibration step.
Figure 3:
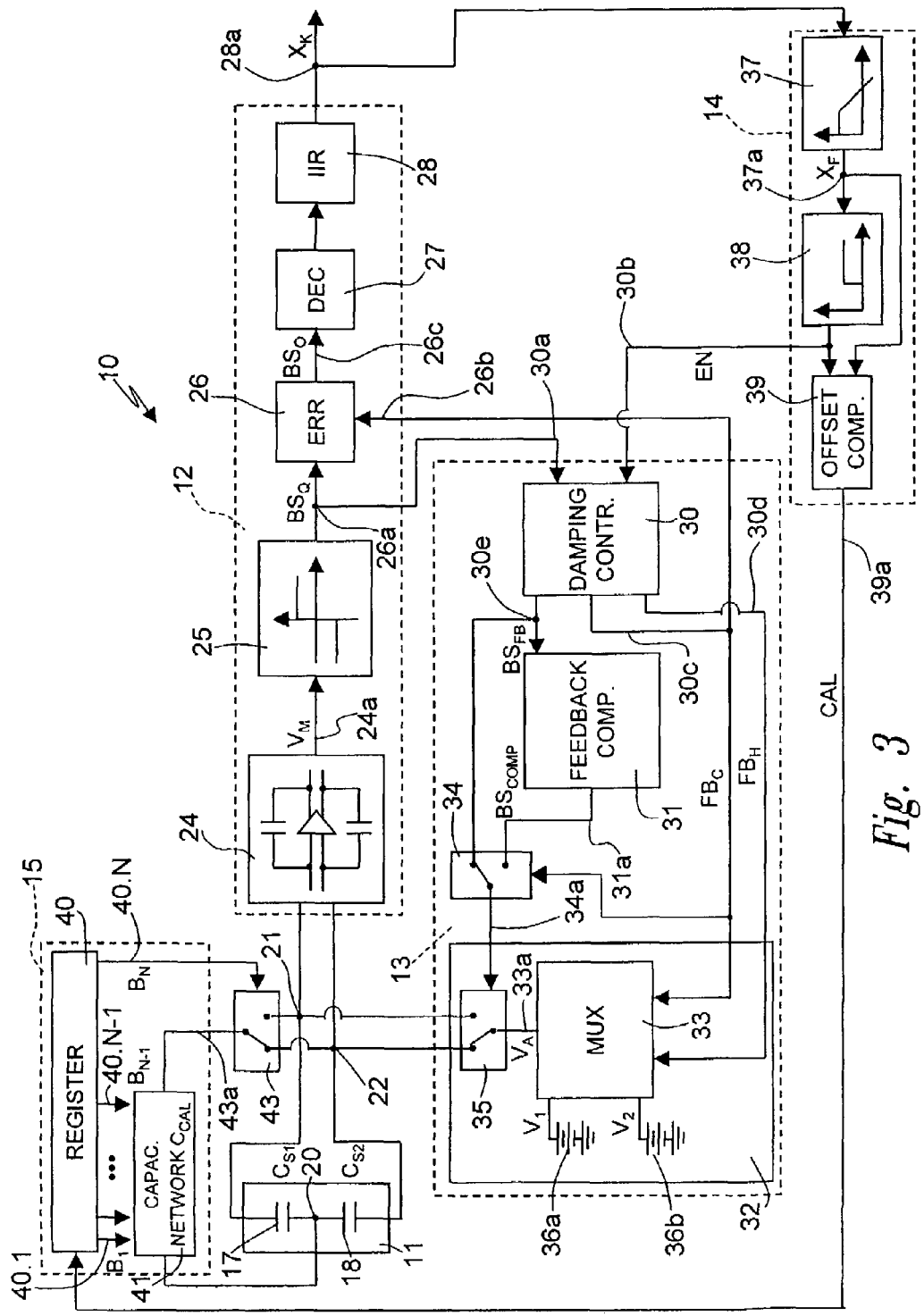
FIG. 3 is a simplified block diagram of an oversampling electromechanical modulator according to the present invention.
Figure 8:
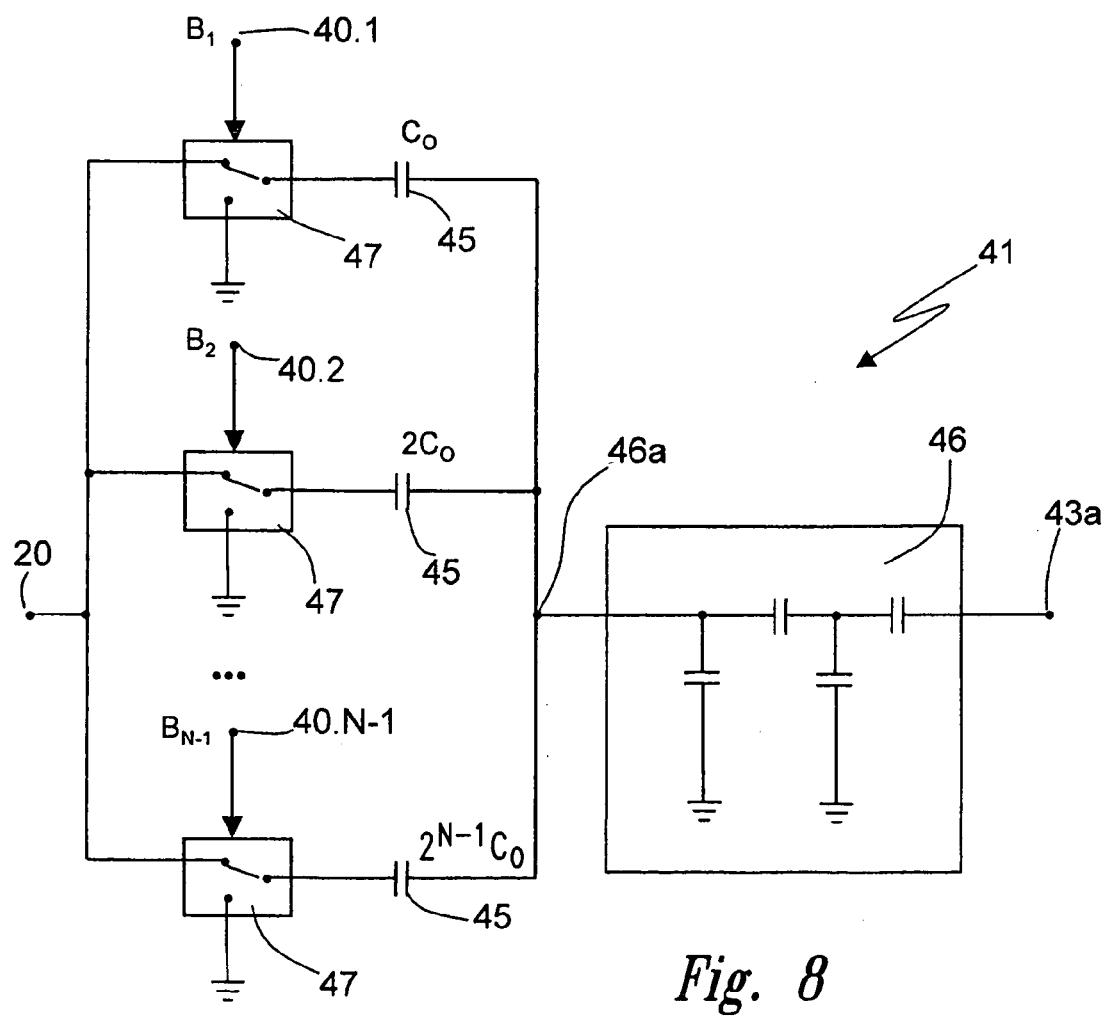
Figure 5:
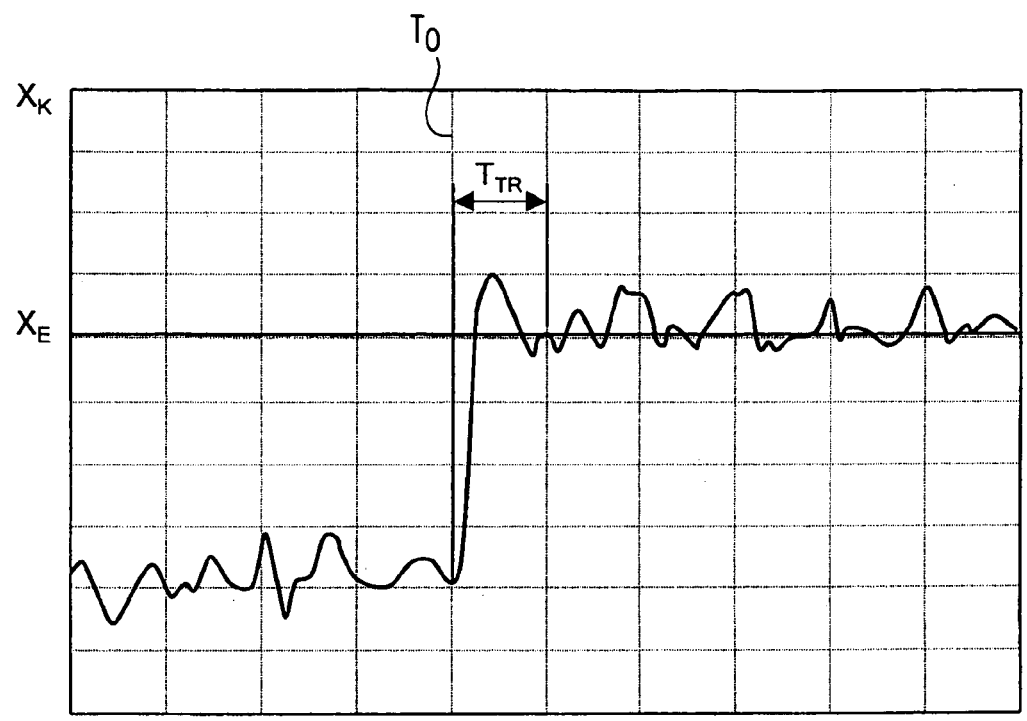

FIGS. 5, 6A–6H, 7A, and 7B show plots in time of quantities related to the electromechanical modulator of FIG. 3; and FIG. 8 is a circuit diagram of a block of the diagram of FIG. 3.

DETAILED DESCRIPTION OF THE INVENTION

The invention finds advantageous application in all cases in which a micro-electromechanical sensor is used for detecting a quantity the frequency spectrum of which does not include the continuous component (i.e., it does not comprise a zero frequency). For example, an electromechanical modulator according to the present invention can be used for controlling the position of R/W heads for reading and writing hard disks in electronic computers.

With reference to FIG. 3 an oversampling electromechanical modulator 10 comprises a MEMS sensor 11, a converter stage 12, a feedback stage 13, an offset-sensing stage 14, and a calibration circuit 15.

Figure 4:
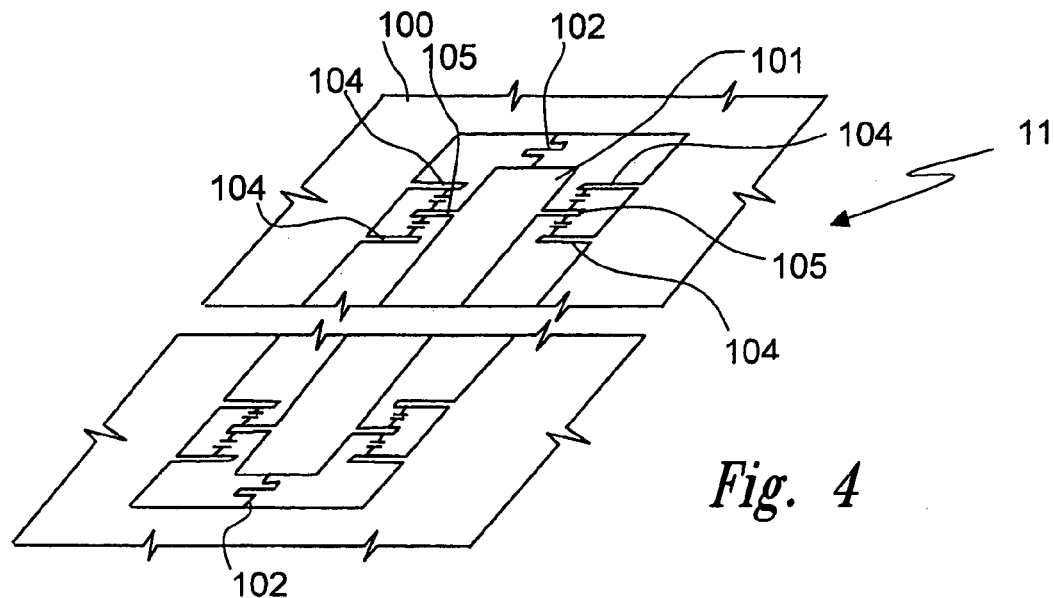
FIG. 4 is a simplified perspective view of a micro-electromechanical sensor of the electromechanical modulator of FIG. 3.

The MEMS sensor 11, the structure of which is shown in FIG. 4, in the embodiment herein described is a linear accelerometer for detection of an acceleration A and comprises a stator 100 and a mobile mass 101. The stator 100 and mobile mass 101, which are made of an appropriately doped semiconductor material, are connected together by means of elastic-suspension elements (springs) 102 and are constrained in such a way that the mobile mass 101 has a translational degree of freedom with respect to the stator 100. In addition, the stator and the mobile mass have a plurality of fixed arms 104 and a plurality of mobile arms 105, respectively, which are comb-fingered together. In practice, each mobile arm 105 is arranged between a pair of fixed arms 104, so as to form a pair of capacitors which have a common terminal and a capacitance that depends upon the relative positions of the arms, namely upon the position of the mobile mass with respect to the stator.

Again with reference to FIG. 3, the MEMS sensor 11 is here schematically represented by a first sensing capacitor 17 and a second sensing capacitor 18, which respectively have a first sensing capacitance $C_{S1}$ and a second sensing capacitance $C_{S2}$. In particular, the first sensing capacitor 17 is connected between a first stator terminal 21 and a common terminal 20, which is connected to the mobile mass 101 of the MEMS sensor 11, and the second sensing capacitor 18 is connected between a second stator terminal 22 and the common terminal 20.

The converter stage 12 comprises a charge integrator 24, a quantizer 25, a correction circuit 26, a decimator 27, and an IIR filter 28, which are cascaded together.

In greater detail, the charge integrator 24 has a pair of inputs, one of which is connected to the first stator terminal 21 and the other to the second stator terminal 22 of the MEMS sensor 11, and an output 24a which is connected to an input of the quantizer 25 and supplies an analog voltage $V_M$ correlated to the capacitive unbalance between the stator terminals 21, 22.

The quantizer 25, which in the present case is a one-bit quantizer, has an output connected to a signal input 26a of the correction circuit 26 and supplies a quantization bit-stream $BS_Q$, the bits of which are correlated to the signal of the capacitive unbalance between the stator terminals 21, 22 with respect to the common terminal 20. The correction circuit 26 moreover has a control input 26b, which is connected to the feedback stage 13, as will be explained in greater detail hereinafter, and an output 26c which supplies an output bitstream $BS_O$ and is connected to an input of the decimator 27, which in turn is cascaded to the IIR filter 28.

The IIR filter 28 has an output 28a forming the output of the modulator 10 and supplying a numeric signal $X_K$ that represents the acceleration A to which the MEMS sensor 11 is subjected in a generic sampling instant K.

The feedback stage 13 comprises a damping-control circuit 30, a feedback compensator 31, and an actuation-control circuit 32.

In detail, the damping-control circuit 30 has a first input 30a, which is connected to the output 26a of the quantizer 25 and receives the quantization bitstream $BS_Q$, and a second input 30b, which is connected to the offset-sensing stage 14, as will be explained later on. In addition, the damping-control circuit 30 has a first output 30c, which is connected to a first input of the actuation-control circuit 32 and to the control input 26b of the correction circuit 26 and supplies a first feedback-control signal $FB_C$; a second output 30d, which is connected to a second input of the actuation-control circuit 32 and supplies a second feedback-control signal $FB_H$; and a third output 30e, which is connected to an input of the feedback compensator 31 and supplies a feedback bitstream $BS_{FB}$.

The feedback compensator 31 has an output 31a that supplies a compensation bitstream $BS_{COMP}$ and is connected to a first input of a first selector 34. The first selector 34 has also a second input connected to the third output 30e of the damping-control circuit 30, so as to receive the feedback bitstream $BS_{FB}$; a control input connected to the first output 30c of the damping-control circuit 30, so as to receive the first feedback-control signal $FB_C$; and an output 34a which is connected to a third input of the actuation-control circuit 32.

The actuation-control circuit 32 comprises a multiplexer 33, a second selector 35, and at least a first voltage generator 36a and a second voltage generator 36b, respectively supplying a first voltage $V_1$ and a second voltage $V_2$ which are distinct from one another (for instance, the second voltage $V_2$ is higher than the first voltage $V_1$). In detail, the multiplexer 33 has a first control terminal and a second control terminal which are respectively connected to the first output 30c and to the second output 30d of the damping-control circuit 30; a first transfer terminal and a second transfer terminal which are respectively connected to the first voltage generator 36a and to the second voltage generator 36b; and an output 33a, which is connected to an input of the second selector 35 and supplies an actuation voltage $V_A$. In particular, during the self-calibration steps, the actuation voltage $V_A$ is equal to the second voltage $V_2$ when both the first feedback-control signal $FB_C$ and the second feedback-control signal $FB_H$ are high; otherwise, it is equal to the first voltage $V_1$. During normal operation of the device, instead, the actuation voltage $V_A$ is set equal to the second voltage $V_2$ whenever a change of sign is detected in the feedback bitstream $BS_{FB}$; immediately afterwards, the actuation voltage $V_A$ is brought back again to the value of the first voltage $V_1$.

The second selector 35 has a control terminal, which is connected to the output 34a of the first selector 34, and a first output and a second output, which are respectively connected to the first stator terminal 21 and to the second stator terminal 22 of the MEMS sensor 11.

In this way, in practice, the stator terminals 21, 22 are used also as actuation terminals (with time-sharing access), and it is possible to exert on the mobile mass 101 of the MEMS sensor 11 electrostatic feedback forces which are different also in absolute value, besides being different in direction.

The absolute value is in fact determined by the value of the actuation voltage $V_A$, whereas the direction depends upon whether the actuation voltage $V_A$, via the second selector 35, is supplied to the first stator terminal 21 or to the second stator terminal 22. In practice, when the actuation voltage is equal to the second voltage $V_2$, a force having higher absolute value is exerted.

The offset-sensing stage 14 comprises a low-pass filter 37, a comparator circuit 38, and an offset-compensation circuit 39.

In detail, the low-pass filter 37, which has a cutoff frequency preferably lower than 30 Hz, has an input connected to the output 28a of the IIR filter 28 and an output 37a connected to inputs of the comparator circuit 38 and of the offset-compensation circuit 39 and supplying a filtered signal $X_F$, which indicates the continuous component of the numeric signal $X_K$.

The comparator circuit 38 moreover has an output which is connected to the offset-compensation circuit 39 and to the second input 30b of the damping-control circuit 30 and supplies an enabling signal EN. In particular, the enabling signal EN has a first logic value (for example high) when the filtered signal $X_F$ is higher than a predetermined threshold, and a second logic value (low) otherwise; in addition, the said threshold is preferably programmable, in a way in itself known.

The offset-compensation circuit 39 has an output 39a connected to the calibration circuit 15 and supplies a calibration signal CAL, which indicates the value of a calibration capacitance to be connected to the MEMS sensor 11 for compensating the presence of possible offsets, as explained hereinafter.

The calibration circuit 15 comprises an N-bit register 40 (for example, with N=7) and a programmable capacitive network 41.

The register 40 has a writing input connected to the output 39a of the offset-compensation circuit 39, in such a way as to receive the calibration signal CAL; programming outputs 40.1, . . . , 40.N−1, which are connected to respective programming inputs of the programmable capacitive network 41 and supply respective programming signals $B_1$–$B_{N-1}$; and a sign output 40.N, which supplies a sign bit $B_N$.

The programmable capacitive network 41 (an embodiment of which is shown in FIG. 8) is selectively connectable in parallel to the first sensing capacitor 17 or to the second sensing capacitor 18. In greater detail, the programmable capacitive network 41 has a first terminal connected to the common terminal 20 of the MEMS sensor 11 and a second terminal connected to an input 43a of a third selector 43, which moreover has a control terminal connected to the sign output 40.N of the register 40. The third selector 43 also has a first output and a second output which are respectively connected to the first stator terminal 21 and to the second stator terminal 22 of the MEMS sensor 11. In addition, the programmable capacitive network 41 has a calibration capacitance $C_{CAL}$ ranging between a minimum value and a maximum value (for example, 0.45 fF and 28.8 fF, respectively) with discrete step increments $\Delta C_{CAL}$, for example 0.45 fF. In other words, the calibration capacitance $C_{CAL}$ may assume a predetermined number of discrete values comprised between the maximum value and the minimum value, and the step $\Delta C_{CAL}$ represents the unit increment between any two successive values.

Operation of the oversampling modulator 10 will be described hereinafter.

The electromechanical modulator 10 is timed in a known way and has clock cycles with a predetermined duration.

In normal operating conditions i.e., when the capacitances $C_{S1}$, $C_{S2}$ of the sensing capacitors 17, 18 are balanced at rest, the continuous component of the numeric signal $X_K$ is substantially absent, given that the band of the quantity detected by the MEMS sensor 11 (acceleration A) does not comprise zero frequency.

In this case, the filtered signal $X_F$ generated by the low-pass filter 37 is lower than the threshold of the comparator 38, the enabling signal EN is low, and the offset-compensation circuit 39, which is disabled, holds the calibration signal CAL on the output 39a at a zero value. In addition, when the enabling signal EN is low, the damping-control circuit 30 sets the feedback-control signals $FB_C$, $FB_H$ at a first logic value, for example low. In this condition, the feedback bitstream $BS_{FB}$ and the output bitstream $BS_O$ are equal to the quantized bitstream $BS_Q$, which substantially has a zero average, and, moreover, the feedback selector 34 connects its own output 34a to the output 31a of the feedback compensator 31. According to the pattern of the feedback bitstream $BS_{FB}$, the actuation-control circuit 32 selects one of the values of the actuation voltage $V_A$ and supplies it selectively to one of the stator terminals 21, 22 of the MEMS sensor 11, in a way in itself known and described, for example, in "A Fully Differential Lateral ΣΔ Accelerometer with Drift Cancellation Circuitry," by M. A. Lemkin, B. E. Boser, and D. M. Auslander, Solid-State Sensor and Actuator Workshop, Hilton Head, S.C., 1996. In practice, the electromechanical modulator 11 implements an analog-to-digital converter substantially of the sigma-delta type. It should, however, be pointed out that that oversampling electromechanical modulators present certain peculiarities whereby they cannot be strictly accommodated within the category of sigma-delta converters, as is known and as is explained in the above-mentioned article.

If, instead, the capacitances between the stator terminals 21, 22 and the common terminal 20 are not balanced at rest, in the band of the numeric signal $X_K$ there is a non-zero continuous component. Consequently, the filtered signal $X_F$ is different from zero and, if it exceeds the threshold of the comparator 38, activates a self-calibration step. In particular, the enabling signal EN switches, going to the high state, and activates the offset-compensation circuit 39, which, using the filtered signal $X_F$, determines a value of the calibration signal CAL. The calibration signal CAL, which is now non-zero, is then used to modify the contents of the register 40 and, consequently, the value of the calibration capacitance $C_{CAL}$ of the programmable capacitive network 41. In particular, the calibration signal CAL alternatively determines either an increase or a decrease by one step $\Delta C_{CAL}$ of the calibration capacitance $C_{CAL}$ according to the sign of the filtered signal $X_F$. In addition, the value of the sign bit $B_N$ supplied by the sign output 40.N of the register 41 controls the third selector 43 in such a way as to connect the programmable capacitive network 41 in parallel to one between first stator capacitor 17 and the second stator capacitor 18, in particular to the one having smaller capacitance.

According to the invention, in practice, the converter stage 12, the offset-sensing stage 14, and the calibration circuit 15 form, with the MEMS sensor 11, a calibration-control loop. In this way, it is possible to automatically detect and eliminate the effects due to position offsets of the mobile mass 101 or to any intrinsic capacitive unbalance of the MEMS sensor 11, which give rise to a continuous component of the numeric signal $X_K$. In fact, whenever the filtered signal $X_F$ exceeds the threshold of the comparator 38, a calibration step is activated, during which the value of the calibration capacitance $C_{CAL}$ is varied by one step $\Delta C_{CAL}$, so as to re-balance the capacitances $C_{S1}$, $C_{S2}$ of the stator capacitors 17, 18. Since the phenomena that cause drifts and the appearance of offsets in MEMS sensors are slow if compared to the variations in the electrical operating quantities, a single calibration step is generally sufficient for eliminating the continuous component of the numeric signal $X_K$. Otherwise, at the end of the first calibration step, a residual continuous component in the band of the numeric signal $X_K$ is again detected automatically, and a new calibration step is carried out iteratively.

The electromechanical modulator 10 operates also to reduce the mechanical stress on the MEMS sensor 11 and the distortions of the numeric signal $X_K$ which occur during a settling transient of the self-calibration step, in particular on account of the variations imposed on the calibration capacitance $C_{CAL}$ of the programmable capacitive network 41. As is known, in fact, these variations modify the average electrostatic forces applied to the mobile mass 101 of the MEMS sensor 11, which thus stabilizes itself, with damped oscillations, about a new mean position of equilibrium $X_E$ (see, in this connection, FIG. 5, in which the instant at which the calibration capacitance $C_{CAL}$ is modified is designated by $T_0$, and the duration of the settling transient is designated by $T_{TR}$).

In detail, when the filtered signal $X_F$ exceeds the threshold of the comparator 38 (instant $T_0$), the enabling signal EN is set at the high state and enables the offset-compensation circuit 39, as already explained. In addition, when the enabling signal EN is high, the damping-control circuit 30 sets the first feedback-control signal $FB_C$ at a second logic value (high), whilst the second feedback-control signal $FB_H$ remains low. In this way, the first selector 34 switches and connects its own output 34a with the third output 30e of the damping-control circuit 30, in practice de-activating the feedback compensator 31. In addition, the multiplexer 33 sets the actuation voltage $V_A$ equal to the first voltage $V_1$ (FIG. 6D).

With reference also to FIGS. 6A–6H, starting from the instant $T_0$, the damping-control circuit 30 modifies the feedback bitstream $BS_{FB}$ in the way that is described in what follows. Initially and up to an instant $T_1$, in which the analog voltage $V_M$ changes sign for the first time (FIG. 6B), the feedback bitstream $BS_{FB}$ remains at one and the same constant value (FIG. 6C). In this step, the actuation voltage $V_A$ is equal to the first voltage $V_1$, and an electrostatic force constant in absolute value and in direction is applied to the mobile mass 101 of the MEMS sensor 11 in such a way as to displace the mobile mass 101 itself towards the new position of equilibrium $X_E$ (FIGS. 6A). In addition, when, at the instant $T_0$, the first feedback-control signal $FB_C$ switches going to the high state, the correction circuit 26 modifies the output bitstream $BS_O$ and supplies a bitstream with zero average (+1 −1 +1 −1, etc.)

At the instant $T_1$, the feedback bitstream $BS_{FB}$ switches, and the damping-control circuit 30 sets the second feedback-control signal $FB_H$ at the high state (FIG. 6G). Consequently, the actuation voltage $V_A$ is now equal to the second voltage $V_2$. In addition, the electrostatic force F changes direction and has a magnitude greater than in the time interval comprised between the instants $T_0$ and $T_1$ (FIGS. 6D and 6E).

Next, while in a clock cycle immediately following upon the instant $T_1$ the feedback-control signals $FB_C$, $FB_H$ are brought back to the low value (FIGS. 6F and 6G), the feedback bitstream $BS_{FB}$ is kept constant for a predetermined number M of clock cycles. At this point, the damping-control circuit 30 and the correction circuit 26 return to the normal operating conditions, and the feedback bitstream $BS_{FB}$ and output bitstream $BS_O$ are again set equal to the quantization bitstream $BS_Q$. In addition, the enabling signal EN switches and returns to the low state.

Since a residual high-frequency noise is superimposed on the analog signal $V_M$, the instant $T_1$ at which for the first time after the instant $T_0$ the analog signal $V_M$ changes sign (and the feedback bitstream $BS_{FB}$ switches) precedes the instant $T_2$ at which the mobile mass 101 of the MEMS sensor 11 reaches the new position of equilibrium $X_E$ (FIG. 6A). In practice, in order to prevent, in the movement of the mobile mass 101, extreme over-elongations beyond the new position of equilibrium $X_E$, the mobile mass 101 is initially decelerated with a first electrostatic force F pulse opposite to the direction of motion and having high magnitude, and next with M pulses which are all in the same direction as the first pulse, but have a smaller magnitude. In addition, the first pulse is supplied in advance with respect to the instant $T_2$ at which the mobile mass 101 of the MEMS sensor 11 reaches the new position of equilibrium $X_E$, and the M subsequent pulses are all in the same direction, irrespective of the changes in sign of the analog signal $V_M$, and hence of the quantization bitstream $BS_Q$.

Figure 7A:
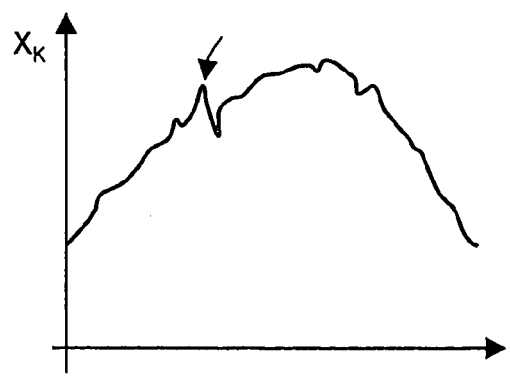
Figure 7B:
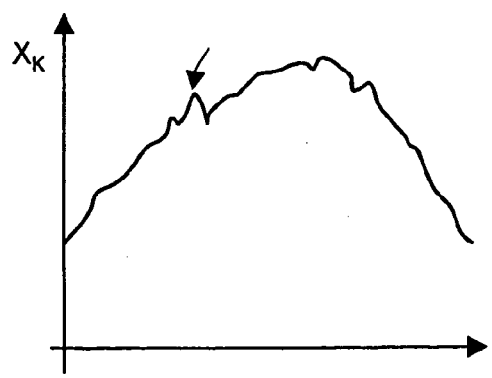

At the same time, the action of the correction circuit 26, which supplies a zero-average bitstream during the self-calibration step, makes it possible to prevent disturbance peaks of the numeric signal $X_K$ due to the transient unbalancing induced into the electromechanical modulator 10 precisely for carrying out self-calibration. By way of example, FIGS. 7a and 7b show the plot of the numeric signal $X_K$ in response to a same input waveform. In both cases, a self-calibration step is performed, but in the example of FIG. 7A the correction circuit 26 has been deactivated (the arrows identify start of the self-calibration step).

With reference to FIG. 8, the programmable capacitive network 41 preferably comprises a battery of insertable capacitors 45 and a fixed capacitive network 46 which has a predetermined capacitance and has a first terminal connected to the input 43a of the third selector 43, and a second terminal 46a. Each of the insertable capacitors 45 has a first terminal connected to the second terminal 46a of the fixed capacitive network 46 and a second terminal alternatively connectable to ground and to the common terminal 20 of the MEMS sensor 11 via a respective programming selector 47. The programming selectors 47 moreover have control terminals connected to a respective one among the programming outputs 40.1, . . . , 40.N−1 of the register 40 and are each controlled by a respective programming bit $B_1$–$B_{N-1}$.

The insertable capacitors 45 have respective binarily weighted capacitances, namely capacitances respectively equal to $C_0$, $2C_0$, . . . , $2^{N-1}C_0$. In practice, the whole capacitance between the second terminal 46a of the fixed capacitive network 46 and the common terminal 20 is equal to the sum of the capacitances of the insertable capacitors 45 that are actually used and can range from $C_0$ to $(2^N-1)C_0$.

It is clear from the above discussion that the electromechanical modulator according to the present invention affords the following advantages. In the first place, it is possible to detect and correct automatically any offsets that may arise during use of the device, and hence after the preliminary calibration performed in the factory. In addition, self-calibration can be carried out during normal operation of the electromechanical modulator, and the MEMS sensor 11 does not have to be set in any particular quiescent conditions.

A further advantage is that, during self-calibration, the micro-electromechanical structure is driven so as to avoid abrupt mechanical stress, which could damage it. In particular, the maximum value of modification of the capacitance in the calibration step is divided into a plurality of unit increments, and, in each self-calibration step, the calibration capacitance $C_{CAL}$ of the programmable capacitive network 41 is varied by only one unit increment $\Delta C_{CAL}$. Possibly, self-calibration can be repeated iteratively if the initial offset is not completely eliminated. In addition, the mobile mass 101 of the MEMS sensor 11 is decelerated before the new position of equilibrium is reached, so as to avoid extreme over-elongations.

In addition, the correction applied to the output bitstream $BS_O$ enables a considerable reduction in the distortions of the numeric signal $X_K$ during a self-calibration step.

Finally, it is clear that modifications and variations may be made to the electromechanical modulator described herein, without thereby departing from the scope of the present invention.

For example, a MEMS sensor having rotational and/or translational degrees of freedom other than the ones illustrated can be used. In addition, the actuation-control circuit 32 could supply an arbitrary number of values of the actuation voltage so as to be able to apply electrostatic forces having different intensities to the mobile mass.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A device, comprising:
    a micro-electromechanical sensor having first and second sensing capacitances configured to be unbalanced by physical displacement of the sensor;
    a first circuit configured to detect an unbalance of the first and second capacitances and provide a displacement signal at an output correlated to the unbalance;
    a second circuit configured to detect a steady state component of the displacement signal and supply a compensation signal; and
    a third circuit configured to modify the first and second capacitances to eliminate the steady state component.

2. The device of claim 1 wherein the third circuit applies a voltage to the first or second capacitance.

3. The device of claim 1 wherein the third circuit adds a capacitive value to the first or second capacitance.

4. The device of claim 1 wherein the third circuit is coupled to the sensor and includes a programmable calibration capacitance, and wherein the second circuit is coupled to control the third circuit.

5. The device of claim 1 wherein the second circuit includes:
    a filter to supply a filtered signal correlated to the steady state component of the displacement signal; and
    a comparator coupled to the filter to compare the filtered signal to a threshold.

6. The device of claim 5 wherein the filter includes a low-pass filter having a cutoff frequency of less than 30 Hz.

7. The device of claim 1 wherein the sensor includes a first sensing and actuation terminal and a second sensing and actuation terminal, and wherein the third circuit includes a programmable capacitive network that is selectively coupleable to the first and second sensing and actuation terminals.

8. The device of claim 7 wherein the first circuit includes a damping-control circuit and an actuation circuit.

9. The device of claim 8 wherein the actuation circuit includes an actuation terminal that can be selectively coupled to the first and second sensing and actuation terminals and that supplies an actuation voltage.

10. The device of claim 9 wherein the actuation voltage has a first voltage value and a second voltage value that are distinct from one another.

11. The device of claim 10 wherein the actuation circuit includes:
   a selector circuit that has an input terminal coupled to the actuation terminal; and
   a first output terminal and a second output terminal respectively coupled to the first sensing and actuation terminal and to the second sensing and actuation terminal.

12. The device of claim 11 wherein the damping-control circuit includes:
   a first output terminal and a second output terminal that are coupled to respective input terminals of the actuation circuit and respectively supply a first control signal and a second control signal to select one between said first voltage value and said second voltage value of said actuation voltage; and
   a third output terminal that can be coupled to a control terminal of the selector circuit and that supplies a feedback signal to couple the actuation terminal of the actuation circuit selectively to the first sensing and actuation terminal and to the second sensing and actuation terminal.

13. The device of claim 12 wherein the first circuit includes a correction circuit that has a control terminal coupled to the first output terminal of the damping-control circuit and an output terminal, the correction circuit being configured to supply a zero-average bitstream at the output terminal, when a selected value is present at said first control signal.

* * * * *